(12) United States Patent
Shrader et al.

(10) Patent No.: US 7,100,002 B2
(45) Date of Patent: Aug. 29, 2006

(54) PORT INDEPENDENT DATA TRANSACTION INTERFACE FOR MULTI-PORT DEVICES

(75) Inventors: Steven Shrader, Boise, ID (US); Samitinjoy Pal, Santa Cruz, CA (US); Anne Espinoza, Austin, TX (US); Michael McKeon, Cedar Park, TX (US)

(73) Assignee: Denali Software, Inc., Palo Alto, CA (US)

( * ) Notice: Subject to any disclaimer, the term of this patent is extended or adjusted under 35 U.S.C. 154(b) by 433 days.

(21) Appl. No.: 10/663,327

(22) Filed: Sep. 16, 2003

(65) Prior Publication Data

US 2005/0060501 A1    Mar. 17, 2005

(51) Int. Cl.
*G06F 12/00* (2006.01)

(52) U.S. Cl. .................. 711/149; 711/151; 365/230.05

(58) Field of Classification Search ............. None
See application file for complete search history.

(56) References Cited

U.S. PATENT DOCUMENTS

| | | | | |
|---|---|---|---|---|
| 4,941,089 A * | 7/1990 | Fischer | ................ | 709/231 |
| 6,006,303 A * | 12/1999 | Barnaby et al. | ........... | 710/244 |
| 6,067,595 A * | 5/2000 | Lindenstruth | .............. | 710/307 |
| 6,178,470 B1 * | 1/2001 | Dowling | ................ | 710/52 |
| 6,311,255 B1 * | 10/2001 | Sadana | ................ | 711/152 |
| 6,665,737 B1 * | 12/2003 | Edwards | ................ | 710/3 |
| 6,671,761 B1 * | 12/2003 | Kim | ................ | 710/244 |
| 6,763,415 B1 * | 7/2004 | Tischler | ................ | 710/240 |
| 6,772,270 B1 * | 8/2004 | Kurpanek | ................ | 710/316 |
| 6,882,645 B1 * | 4/2005 | Jones | ................ | 370/392 |
| 6,976,103 B1 * | 12/2005 | Watanabe et al. | ............. | 710/74 |
| 6,981,054 B1 * | 12/2005 | Krishna | ................ | 709/235 |
| 2004/0205305 A1 * | 10/2004 | Lee et al. | ................ | 711/149 |
| 2005/0055484 A1 * | 3/2005 | Iskiyan et al. | ............. | 710/104 |

* cited by examiner

*Primary Examiner*—Mano Padmanabhan
*Assistant Examiner*—Kaushik Patel
(74) *Attorney, Agent, or Firm*—Patent Venture Group

(57) ABSTRACT

A port independent data transaction interface for multi-port devices is provided. The port independent data transaction interface includes a command channel that receives command data and a source id. The source id indicates a source device that transmitted the command data. In addition, a data-in channel is included that receives write data and a write source id. Similar to the source id, the write source id indicates a source device that transmitted the write data. The port independent data transaction interface further includes a data-out channel that provides read data and a read id. The read id indicates a source device that transmitted a read command corresponding to the read data. The port independent data transaction interface utilizes the source id to associate command data with corresponding write data and read data.

17 Claims, 7 Drawing Sheets

PORT INDEPENDENT DATA TRANSACTION INTERFACE FOR MULTI-PORT DEVICES

BACKGROUND OF THE INVENTION

1. Field of the Invention

This invention relates generally to data transfer interfaces, and more particularly to a port independent data transaction interface for multi-port devices.

2. Description of the Related Art

Multi-port architectures currently are available that allow multiple client devices to communicate to a single device. For example, a conventional multi-client semiconductor memory system includes one or more client devices connected via a bus to a memory controller, which manages data flow to and from the client devices to a memory. Interfaces, or protocols, are used to define communication with the conventional multi-port architectures, as illustrated in FIG. 1A.

FIG. 1A is a block diagram showing a prior art multi-port interface 100. In this example, the multi-port interface 100 defines an interface for a conventional multi-port memory controller 102, and includes a command channel 104, and data-in channel 106, and a data-out Channel 108. The command channel 104 is utilized to provide commands to the memory controller 102, such as read and write commands. The data-in channel 106 is utilized to provide write data to the memory controller 102. For example, when a write command is received on the command channel 104, the data to be written to memory is provided on the data-in channel 106. The data-out channel 108 is utilized to provide data to the requesting device. For example, when a read command is received on the command channel 104, the data read from the memory device is provided to the requesting device on the data-out channel 108.

Unfortunately, the conventional multi-port interface 100 tightly couples the data with the corresponding commands, as illustrated in FIG. 1B. FIG. 1B is a block diagram showing an exemplary prior art multi-port memory architecture 110. The prior art multi-port memory architecture 110 includes a multi-port memory controller 102 coupled to a memory device 114. Coupled to each port of the multi-port memory controller 102, is a source device 112a–112c. As will be appreciated by those skilled in the art, the multi-port memory controller 102 facilitates communication between each source device 112a–112c and the memory device 114.

To interact with the memory device 114, each source device 112a–112c transmits a command to the multi-port memory controller 102, such as a read or write command. In addition, the source device 112a–112c generally must send any data associated with the command, such as data to be written to memory, along with the command to the multi-port memory controller 102. Further, the data generally must be in one of a plurality of predetermined lengths. When data expected to be associated with the command is not provided with the write command, the memory controller 102 generally stalls this command and goes on to the next command from another port. This activity stalls all requests on the original port until the data for the write is received. When the prior art memory controller 102 receives data without a corresponding command, the controller generally views this as an error condition and the transaction is nullified somehow. Thus commands and data are tightly coupled in prior art multi-port interfaces.

For example, to write data to the memory device 114 using source device 112a, source device 112a provides a write command along with the corresponding data to the multi-port memory controller 102. The multi-port memory controller 102 then interprets the write command and writes the corresponding data to the memory device 114 at the memory address specified in the received write command. Thereafter, the write transaction is completed and the multi-port memory controller 102 can accept the next command from the same or another source device 112a–112c.

Similarly, to read data from the memory device 114 using source device 112b, source device 112b provides a read command to the multi-port memory controller 102. The multi-port memory controller 102 then interprets the read command and reads data at the memory address specified in the read command from the memory device 114. Next, the multi-port memory controller 102 provides the data received from the memory device 114 to the source device 112b. Thereafter, the read transaction is completed and the multi-port memory controller 102 can accept the next command from the same or another source device 112a–112c.

As illustrated by the above examples, prior art multi-port interfaces require each transaction to be fully completed before the next transaction can begin. That is, once a transaction is begun, the transaction cannot be interrupted to start a new transaction until the first transaction is completed. For example, during the above read operation, the memory device 114 generally requires several clock cycles to complete the read operation. Thus, the memory controller 102 is idle for several clock cycles, during which the memory device 114 accesses the requested data. Unfortunately, prior art multi-port interfaces do not allow the memory controller 102 to begin processing a command from another source device 112a–112b during this idle time. As a result, the prior art multi-port interfaces generally to do not support fully pipelined architectures wherein data is being processed each clock cycle.

In view of the foregoing, there is a need for a data transaction interface that allows fully pipelined data processing for multi-port devices. The data transaction interface should allow for decoupling of data and corresponding commands, and should further allow for arbitrary data lengths and arbitrary starting address locations. Moreover, the data transaction interfaces should allow transactions to have different priorities, thus allowing higher priority transactions to interrupt prior received lower priority transactions.

SUMMARY OF THE INVENTION

Broadly speaking, the present invention fills these needs by providing a port independent data transaction interface that allows fully pipelined data processing for multi-client devices. The data transaction interface of the embodiments of the present invention allows de-coupling of data and corresponding commands, and further allows for arbitrary data lengths and arbitrary starting address locations. In one embodiment, a port independent data transaction interface for multi-port devices is disclosed. The port independent data transaction interface includes a command channel that receives command data and a source id. The source id indicates a source device that transmitted the command data. In addition, a data-in channel is included that receives write data and a write source id. Similar to the source id, the write source id indicates a source device that transmitted the write data. The port independent data transaction interface further includes a data-out channel that provides read data and a read id. The read id indicates a source device that transmitted a read command corresponding to the read data. The port independent data transaction interface utilizes the source id to associate command data with corresponding write data and read data. In this manner de-coupling is achieved, for example allowing the write data transmitted to the data-in channel and corresponding command data transmitted to the command channel to be processed when transmitted during different clock signals, as can the read data and corresponding command data. In addition, the command channel can further receive length data indicating a size of data corresponding to the command data, thus allowing the length data to indicate an arbitrary data size. Similarly, the command channel can receive address data indicating an address associated with data corresponding to the command data. The address data can indicate an arbitrary starting location for the corresponding data. Moreover, the command channel can receive a priority value indicating a priority level of the command data, thus allowing the command data to be processed based on an associated priority value.

In an additional embodiment, a multi-port memory controller having port independent data transaction interface is disclosed. The multi-port memory controller includes a command transfer storage that receives command information and a source id, which indicates a source device that transmitted the command information. In addition, a data-in transfer storage is included that receives write data and a write source id, which also indicates a source device that transmitted the write data. The source id links the command information with the data associated with that command. The multi-port memory controller further includes a data-out transfer storage that provides read data and a read id. The read id indicates a source device that transmitted a read command corresponding to the read data. In one aspect, a separate data-in signal can be included for each source device coupled to the multi-port memory controller. In this aspect, each data-in signal can be coupled to the data-in transfer storage, and each data-in signal can be further coupled to a data path that circumvents the data-in transfer storage, thus facilitating priority processing when the data-in transfer storage is full.

A method for performing data transactions in a multi-port system is disclosed in a further embodiment of the present invention. The method includes receiving command information and a source id on a command channel during clock cycle N. As above, the source id indicates a source device that transmitted the command data. Also, write data and a write source id is received on a data-in channel during clock cycle M. If there is more data to be transferred than can be delivered in one clock cycle, the additional data is delivered in subsequent clock cycles. Generally, the subsequent data is delivered in the correct order but the actual cycle of each delivery is variable. The write source id indicates a source device that transmitted the write data. The command data and the write data then are associated with each other based on the source id and the write source id, and both are transmitted to a processing circuit for further processing. As will be seen below, cycle N, M, and subsequent M cycles may be separated by a plurality of clock cycles. Cycle M can even precede cycle N. In addition, read data and a read id can be provided on a data-out channel during any clock cycle during this transaction. As above, the read id indicates a source device that transmitted a different read command corresponding to the read data. In this manner, command data can be associated with the read data based on a source id and the read id. As with the above embodiments, the method can include receiving a priority value on the command channel during cycle N, wherein command data is processed based on an associated priority value. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a port independent data transaction interface that allows fully pipelined data processing for multi-client devices. The data transaction interface of the embodiments of the present invention allows decoupling of data and corresponding commands for both read and write transactions, and further allows for arbitrary data lengths and arbitrary starting address locations. Moreover, embodiments of the present invention allow transactions to have different priorities, thus allowing higher priority transactions to interrupt prior received lower priority transactions.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Embodiments of the present invention provide an interface for multi-client devices that achieves high bandwidth and low latency on all requests simultaneously. Generally speaking, the multiple ports of the multi-client device can be efficiently arbitrated to get to a single interface. That is, n to 1 port arbitration is efficiently achieved. Once this is achieved, requests received at the multi-client device are reordered to achieve a high level of efficiency. Embodiments of the present invention define a universal interface that allows for reordering of the requests to achieve a high level of efficiency. It should be noted that the interface of the embodiments of the present invention is not limited to use in memory controllers. Hence, embodiments of the present invention can be utilized to define an interface in any system that moves data, such as a DMA engine.

Figure 1A:
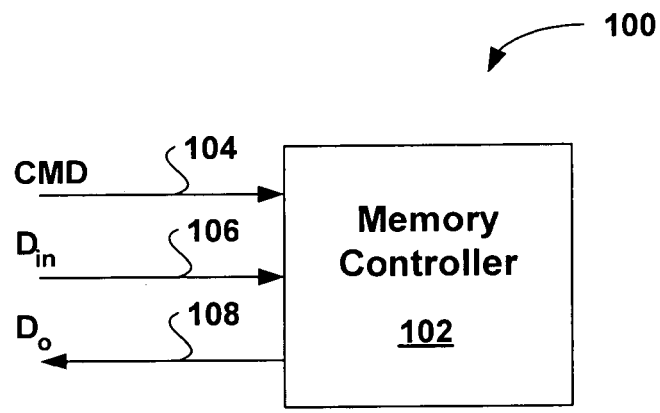
FIG. 1A is a block diagram showing a prior art port in a multi-port interface.
Figure 1B:
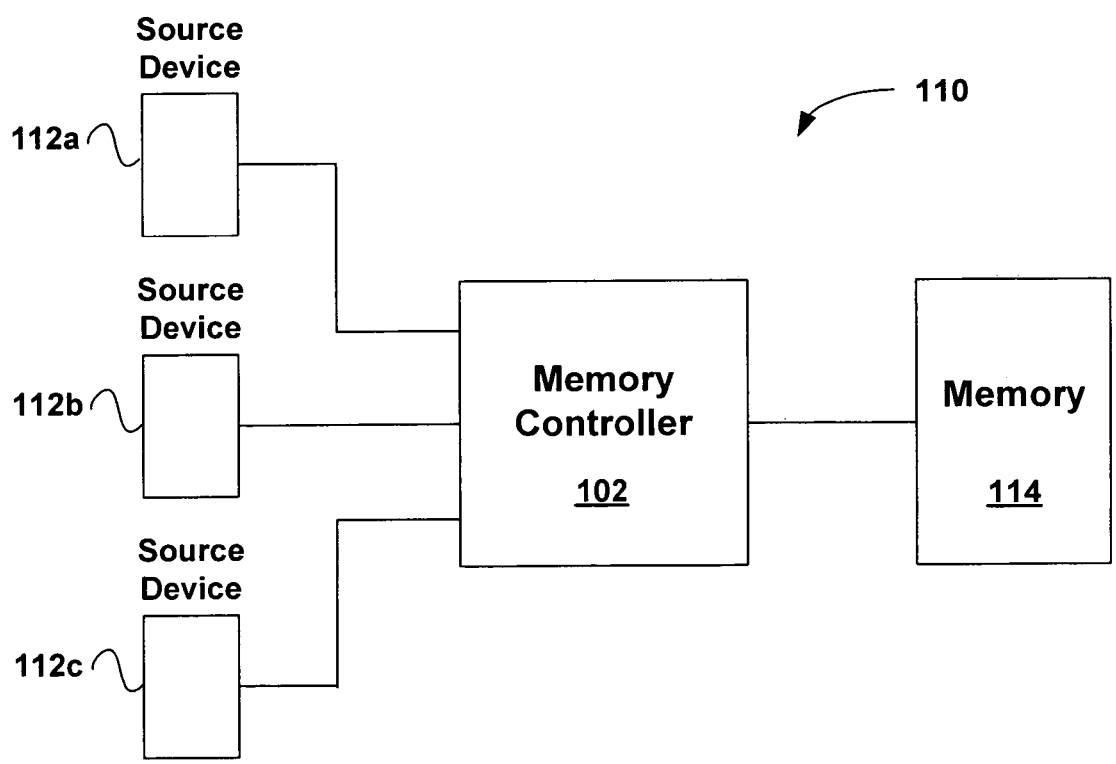
FIG. 1B is a block diagram showing an exemplary prior art multi-port memory architecture.
Figure 2:
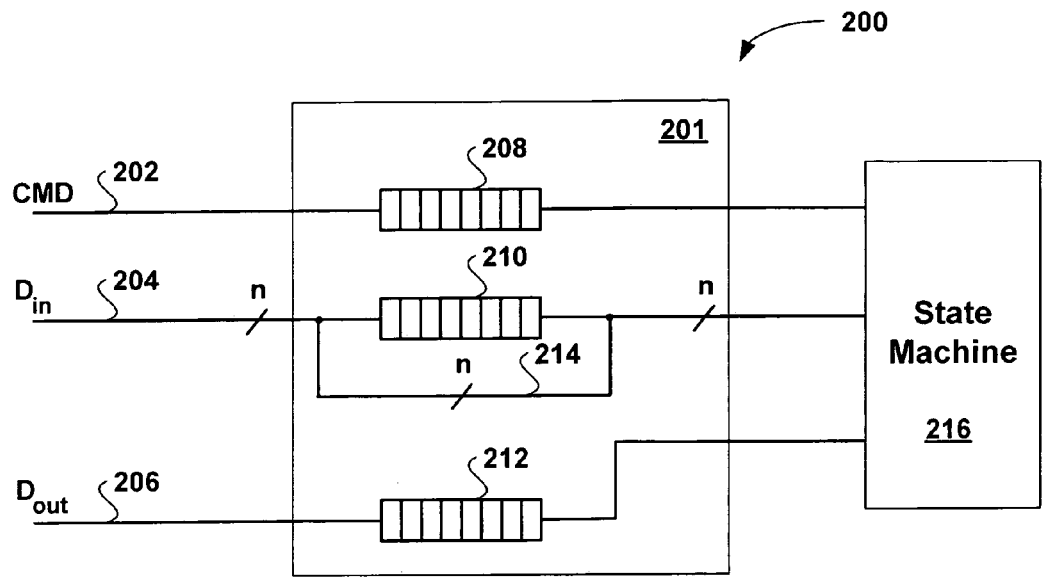
FIG. 2 is an exemplary high-level block diagram showing a data transaction interface for multi-port devices, in accordance with an embodiment of the present invention.

FIG. 2 is an exemplary high-level block diagram showing a data transaction interface 200 for multi-port devices, in accordance with an embodiment of the present invention. As FIG. 2 illustrates, a data transfer storage device 201 receives and transmits data using a plurality of independent channels defined by the data transaction interface 200. These independent channels include a command channel 202, a data-in channel 204, and a data out channel 206.

Each of the independent channels 202–206 provides and receives data to and from a data transfer storage. In particular, the command channel 202 provides command data to a command transfer storage 208, and the data-out channel 206 receives data from a data-out transfer storage 212. In addition, the data-in channel 204 provides write data to a data-in transfer storage 210. The data-in channel 204 also includes a data path 214 that circumvents the data-in transfer storage 210 to provide data directly to the state machine 216, which can be any device that stores, processes, moves, or otherwise utilizes data and control signals provided via the data transaction interface 200. The depths of the data in, data out, and command queues are all individually configurable from 1 to N entries.

As will be described in greater detail below, the data-in channel 204 includes separate data-in signals from each source device coupled to the multi-port device. That is, if n source devices are couple to the multi-port device, n separate data-in signals, one from each source device, will be included in the data-in channel. Also as will be described in greater detail below, the data path 214 of the data-in channel 204 allows for rerouting of write data when the data-in transfer storage 210 is full or the data is needed for a currently executing write command in the controller.

Each data transfer storage 208–212 allows received data to be stored for future processing. Further, each data transfer storage 208–212 is decoupled from the other data transfer storages 208–212. As a result, the data transaction interface 200 of the embodiments of the present invention allows decoupling of commands and associated data. Thus, the data transaction interface 200 allows data to be transmitted to a multi-port device before or after the corresponding command is transmitted to the multi-port device. Moreover, the decoupled data transfer storages 208–212 allow for fully pipelined data processing and priority control, as described next with reference to FIG. 3.

Figure 3:
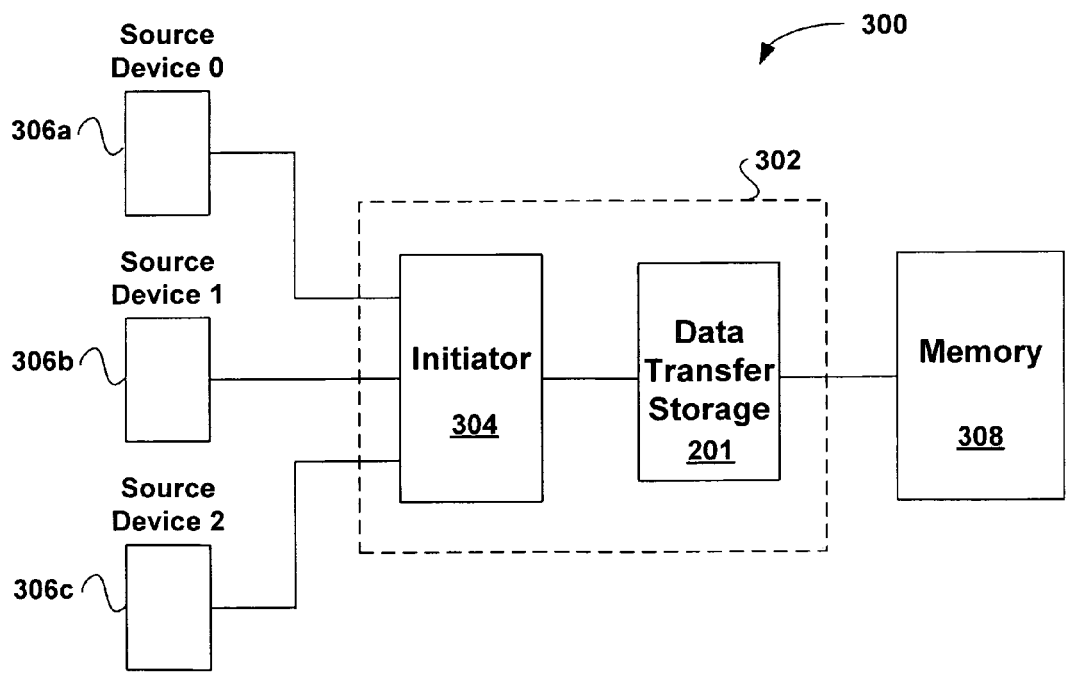
FIG. 3 is a block diagram showing a data transaction system for memory access using a port independent data transaction interface in accordance with an embodiment of the present invention.

FIG. 3 is a block diagram showing a data transaction, system 300 for memory access using a port independent data transaction interface in accordance with an embodiment of the present invention. The data transaction system 300 includes a multi-port memory controller 302 having an initiator 304 and a data transfer storage device 201. The multi-port memory controller 302 controls access to a memory device 308. Coupled to each port of the multi-port memory controller 302 is a source device 306a–306c. As mentioned above the embodiments of the present invention allow fully pipelined data processing for multi-client devices. The data transaction interface of the embodiments of the present invention allows decoupling of data and corresponding commands, and further allows transactions to have different priorities, thus allowing higher priority transactions to interrupt prior received lower priority transactions.

Figure 4:
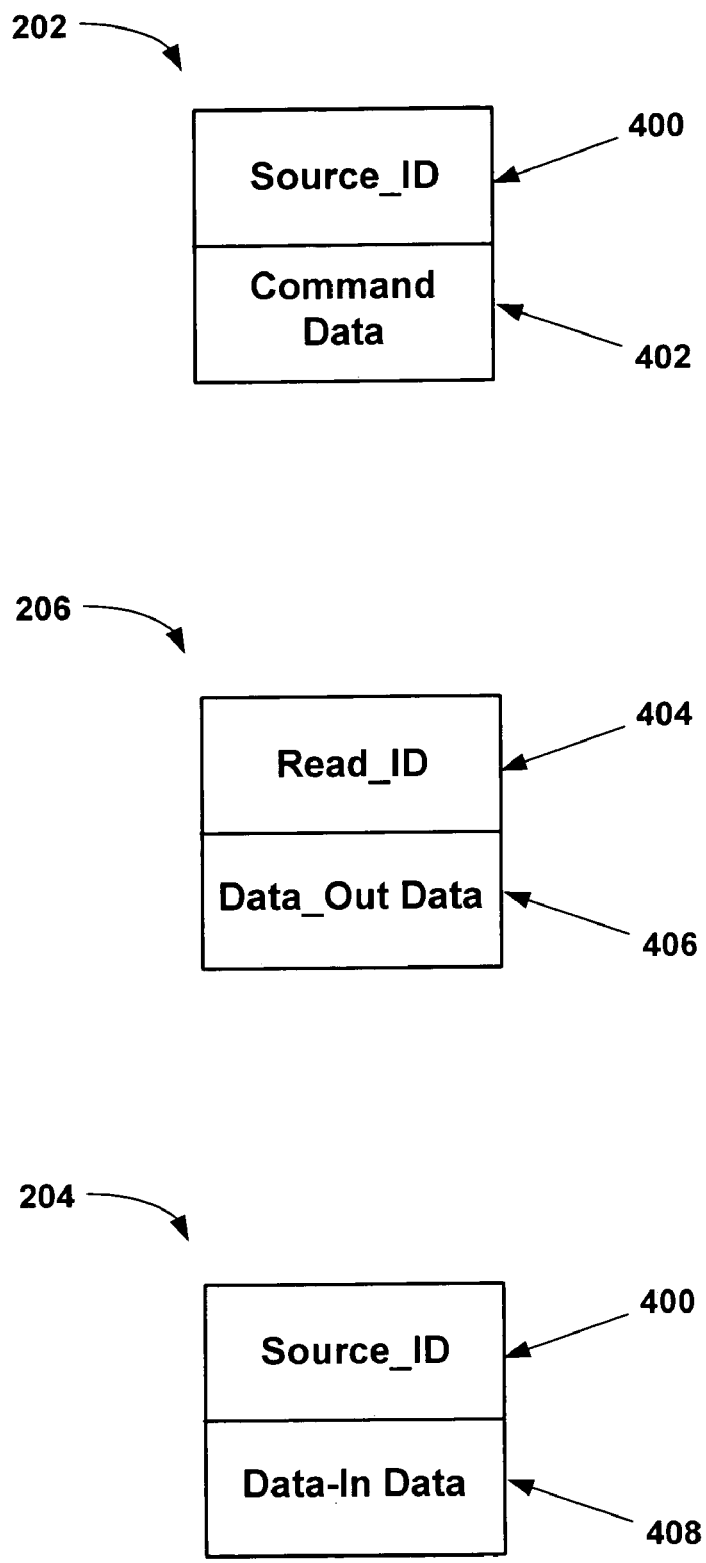
FIG. 4 is a block diagram showing source identification and data relationships in accordance with an embodiment of the present invention.

Embodiments of the present invention provide priority and command/data decoupling by identifying the source of each request. FIG. 4 is a block diagram showing source identification and data relationships in accordance with an embodiment of the present invention. Specifically, FIG. 4 illustrates source identification and data relationships for the command channel 202, the data-out channel 206, and the data-in channel 204. For each transaction, embodiments of the present invention identify the source of the transaction request. For example, when command data 402 is received on the command channel 202, a source_id 400 identifying the source device that transmitted the command data 402 is provided with the command data 402. Similarly, when data-out data 406 is provided on the data-out channel 206, a read_id 404 is provided with the data-out data 406. The read_id 404 identifies the source device requesting the data-out data 406, and corresponds to the source_id 400 that the source device provided with the read command.

In one embodiment, when data-in data 408 is received on the data-in channel 204, a source_id 400 identifying the source device that transmitted the data-in data 408 can be included with the data-in data 408. In one embodiment, the source_id 400 can be appended to the data-in data 408 instead of using separate data lines for the source id 400. However, is should be noted that other mechanisms can be utilized to identify the source of the data-in data 408. Using source_ids 400 and write_ids 404 embodiments of the present invention allow decoupling of command data and corresponding read/write data because the source_ids 400 and read_ids 404 can be used to associate commands with corresponding data even when received at different times.

For example, referring back to FIG. 3, source device 0 306a can transmit write data to the memory controller 302, along with a source_id identifying source device 0 306a as the source of the write data. Subsequently, the source device 0 306a can provide a write command indicating the write memory address, data length, and other write command data to the memory controller 302. Along with the command data the source device 0 306a transmits a source_id identifying source device 0 306a as the source of the write command. In this manner, the memory controller 302 can match the source_id of the write command to the source_id of the write data, and thus process the write command.

Table 1 illustrates command channel signals for the port independent data transaction interface, in accordance with an embodiment of the present invention.

TABLE 1

| Command | Type | Description |
| --- | --- | --- |
| command_type [C:0] | Input | Encoded signal to indicate what action is requested of the controller. |
| command_valid | Input | Control signal indicating there is a valid command on the command interface. |
| command_queue_full | Output | Control signal signifying that the controller is not accepting requests. |
| address[A:0] | Input | Starting address of data transfer in bytes. |
| length[L:0] | Input | Length of data transfer in bytes. A value of 0 indicates the maximum byte request. |

TABLE 1-continued

| Command | Type | Description |
|---|---|---|
| source_id[S:0] | Input | ID associated with the command to be used in read and write data interfaces to tag data with a particular command. |
| Priority[P:0] | Input | Relative priority of command. |

The command channel of the embodiments of the present invention is a fully pipelined storage based interface that allows the user to specify commands every cycle. Commands for data are specified by a starting address and a length field, both of which can be specified in bytes. In one embodiment, the interface for reading data from or writing to external memory devices is enabled via a single synchronous port. Each request for data is defined by a starting address and a length. The length of the request determines how many bytes are to be transferred starting at the address specified. The client device signifies a valid request by asserting the command_valid signal along with the command type, starting address, and the length of the request. In addition, in one embodiment, the client device samples the command_queue_full signal from the memory controller to determine when another command can be issued to the memory controller.

The starting address passed to the memory controller can be for any byte address and a particular number of bytes. For read commands, the memory controller can access the memory and return as many words as necessary to complete the transfer. The same is true for write commands, however, the client device delivers the correct number of words to complete the write transaction. The number of words returned depends on the starting address, the length of the request, and the width of the data-out bus.

Table 2 illustrates command type definitions for the port independent data transaction interface, in accordance with an embodiment of the present invention.

TABLE 2

| Command Type | Value | Description |
|---|---|---|
| Write | 00 | Perform a contiguous write of the specified number of bytes starting at the specified byte address. The write data should be presented on the data-in channel along with an associated data-in valid signal |
| Read | 01 | Perform a read of the specified number of bytes starting at the specified byte address. The read data will be presented on the data-out channel along with the associated data-out_valid signal |
| Masked_Write | 10 | Perform a write of the specified number of bytes starting at the specified byte address. The number of bytes and the starting address can be such that the data can be presented as one user word. If multiple user words need to be transferred along with the byte mask then multiple Masked_Write commands can be issued. The write data can be presented on the data-in channel along with an associated data-in_valid signal and data mast value. This command is used to write non-contiguous bytes per user word. For contiguous write data, use the write command and specify starting byte address and byte length. |
| Refresh | 11 | Perform a refresh cycle to the DRAM devices |

Figure 5:
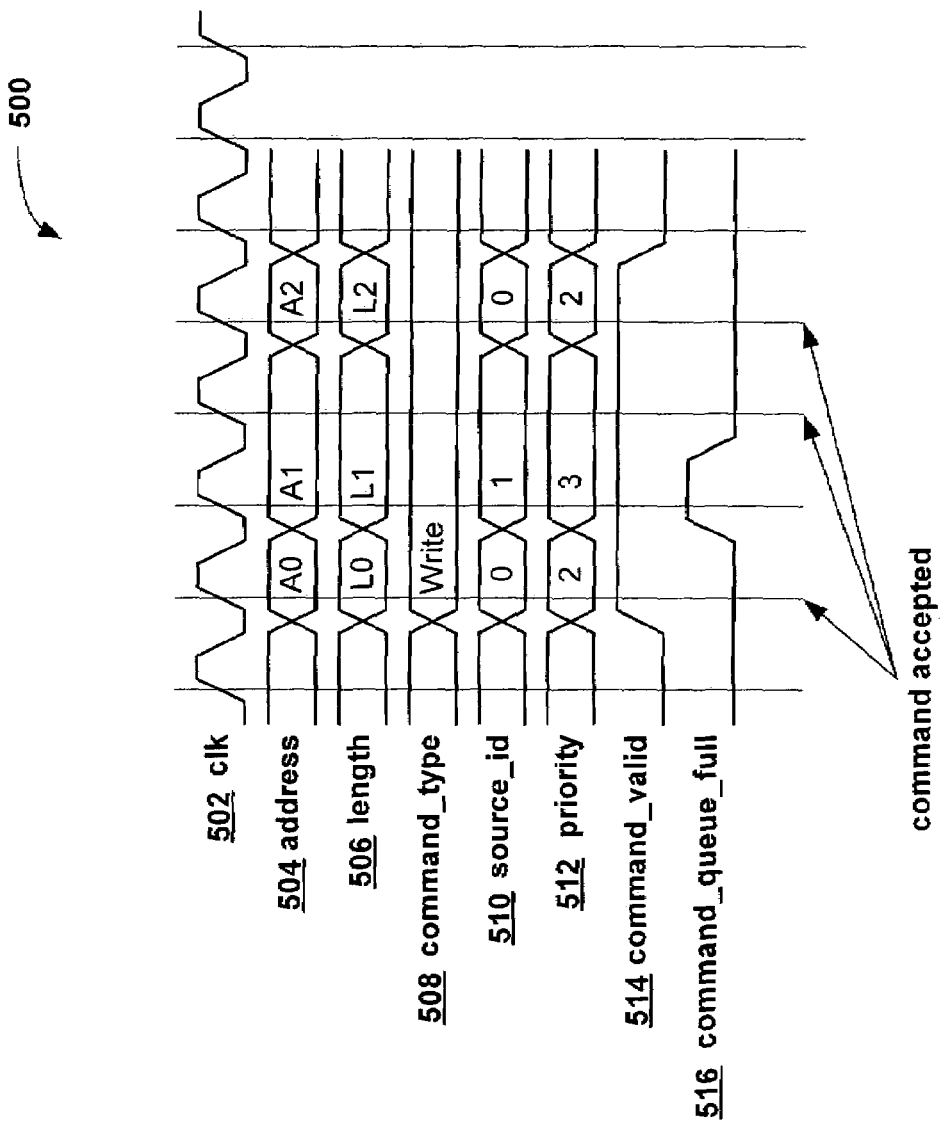
FIG. 5 is a timing diagram showing exemplary command channel waveforms, in accordance with an embodiment of the present invention.

FIG. 5 is a timing diagram showing exemplary command channel waveforms 500, in accordance with an embodiment of the present invention. The command channel waveforms 500 include signals for the clock 502, address lines 504, length lines 506, command_type lines 508, source_id lines 510, priority lines 512, command_valid lines 514, and command_queue_full lines 516.

In the example of FIG. 5, the command channel first receives a write request from source device 0 to write data having a length L0 to memory address A0, and having a priority of level 2. Thus, address A0 is received on the address lines 504 and length L0 is received on the length lines 506. Also, a write command type is received on the command_type lines 508 and a priority of 2 is received on the priority lines 512. In addition, the source_id 0 is received on the source_id lines 510 identifying source device 0 as the source of the write command. Finally, source device 0 signifies the request is valid by asserting the command_valid lines 514.

Since the command channel is pipelined to be able to accept commands until the command transfer storage is full, the command_queue_full lines 516 are utilized to function as a handshaking signal back to the source device to indicate whether the command was accepted. Advantageously, the source device does not respond or stop the pipeline in the same cycle as the command_queue_full signal asserts or de-asserts. The memory controller accepts commands whenever the command_valid signal is asserted and the registered value of the command_queue_full signal is not asserted. As a result, the source device logic has one entire cycle to stop the pipeline of commands. The pipeline stalls as soon as the registered value of the command_queue_full signal 516 asserts and can resume as soon as the registered value of the command_queue_full de-asserts. In this example, the command transfer storage is not full when the command from source device 0 is received, and hence the command_queue_full signal 516 is not asserted.

Next, the command channel receives a write request from source device 1 to write data having a length L1 to memory address A1, and having a priority of level 3. Thus, address A1 is received on the address lines 504 and length L1 is received on the length lines 506. Also, the write command type remains on the command_type lines 508 and a priority of 3 is received on the priority lines 512. In addition, the source_id 1 is received on the source_id lines 510 identifying source device 1 as the source of the write command. Finally, source device 1 signifies the request is valid by asserting the command_valid lines 514. However, now command transfer storage is full, and as a result, the command_queue_full lines 516 are asserted. In response, the above data is left on the lines until the command_queue_full lines 516 are de-asserted in the next clock cycle.

Finally, the command channel receives a write request from source device 0 to write data having a length L2 to memory address A2, and having a priority of level 2. Thus, address A2 is received on the address lines 504 and length L2 is received on the length lines 506. Also, the write command type remains on the command_type lines 508 and a priority of 2 is received on the priority lines 512. In addition, the source_id 0 is received on the source_id lines 510 identifying source device 0 as the source of the write command. Finally, source device 0 signifies the request is valid by asserting the command_valid lines 514. Since, the command transfer storage is not full when the command from source device 0 is received, the command_queue_full signal 516 is not asserted and the command is accepted.

Table 3 below illustrates data-out channel signals for the port independent data transaction interface, in accordance with an embodiment of the present invention.

TABLE 3

| Signal | Type | Description |
| --- | --- | --- |
| dataout[127:0] | Output | The read data associated with a read command. |
| dataout_available | Output | When asserted the data on dataout is valid. The memory controller assumes this data is captured unless the optional dataout_accept pin is configured. |
| dataout_accept | Input | This signal allows the client device to throttle incoming read data. 0 = Data not accepted. The memory controller holds the data on the dataout lines until this signal de-asserts. 1 = Data on the dataout lines is accepted. The memory controller is free to post new data on the dataout lines. |
| read_id | Output | Source ID for read data. This ID corresponds to the source ID sent with the read command on the command channel. |

Read data is returned on the data-out channel of the memory controller. In one embodiment, the data is returned in a word aligned manner based on the size of the data bus defined for the memory controller. The read data is returned in consecutive cycles whenever possible. Requests that cross page boundaries or are interrupted by refresh requirements may include cycles where the dataout_available will de-assert and the re-assert when the subsequent data is available.

Figure 6:
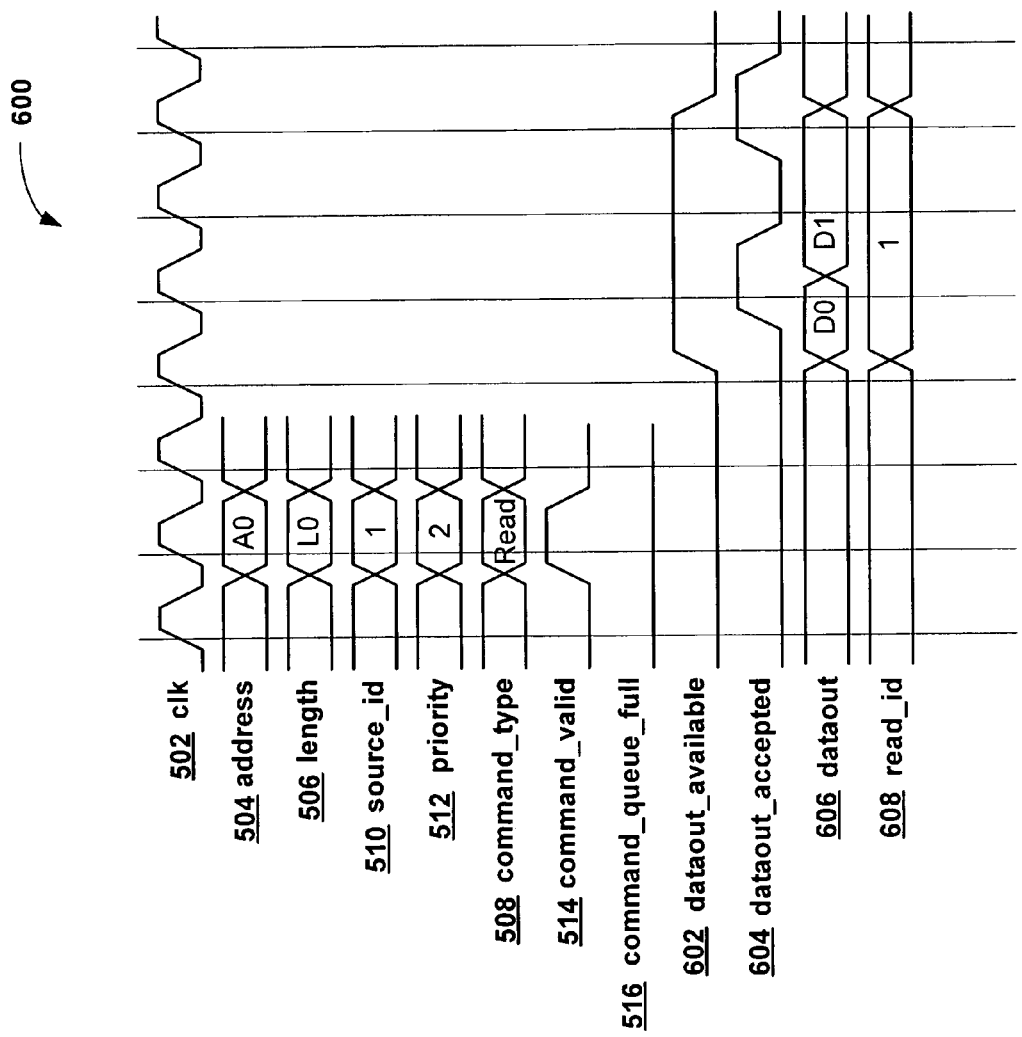
FIG. 6 is a timing diagram showing exemplary data-out channel and command channel waveforms, in accordance with an embodiment of the present invention.

The read data returned can be stalled if the read data cannot be consumed from the memory controller as fast as the memory controller can provide the data. The read data transfer storage along with the dataout_accept input signal controls this operation, as illustrated next with reference to FIG. 6. FIG. 6 is a timing diagram showing exemplary data-out channel and command channel waveforms 600, in accordance with an embodiment of the present invention. The waveforms 600 include command channel signals for the clock 502, address lines 504, length lines 506, command_type lines 508, source_id lines 510, priority lines 512, command_valid lines 514, and command_queue_full lines 516. The waveforms 600 also illustrated data-out channel signals for dataout_available lines 602, dataout_accept lines 604, dataout lines 606, and read_id lines 608.

In the example of FIG. 6, the command channel receives a read request from source device 1 to read data having a length L0 located at memory address A0, and having a priority of level 2. Thus, address A0 is received on the address lines 504 and length L0 is received on the length lines 506. Also, a read command type is received on the command_type lines 508 and a priority of 2 is received on the priority lines 512. In addition, the source_id 1 is received on the source_id lines 510 identifying source device 1 as the source of the read command. Finally, source device 1 signifies the request is valid by asserting the command_valid lines 514.

Upon completing the request, data D0 is placed on the dataout lines 606 and read_id 1 is placed on the read_id lines 608, indicating the data corresponds to a read request from source device 1. In addition, the memory controller signifies the data is ready by asserting the dataout_available lines 602. Since, in this example, the source device can accept the data D0, the source device asserts the dataout_accept lines 604, allowing the memory controller to place the next data D1 on the dataout lines 606. Data D1 also corresponds to a request from source device 1, so read_id 1 remains on the read_id lines 608, and the memory controller signifies the data is ready by asserting the dataout_available lines 602. However, in this cycle, source device 1 is unable to accept the data D1, and thus de-asserts the dataout_accept lines 604. In response, the memory controller leaves data D1 on the dataout lines 606 and read_id 1 on the read_id lines 608. In the subsequent clock cycle 502, source device 1 signals its acceptance of the data D1 by asserting the dataout_accept lines 604, allowing the memory controller to place the next data on the dataout lines 606.

Figure 7:
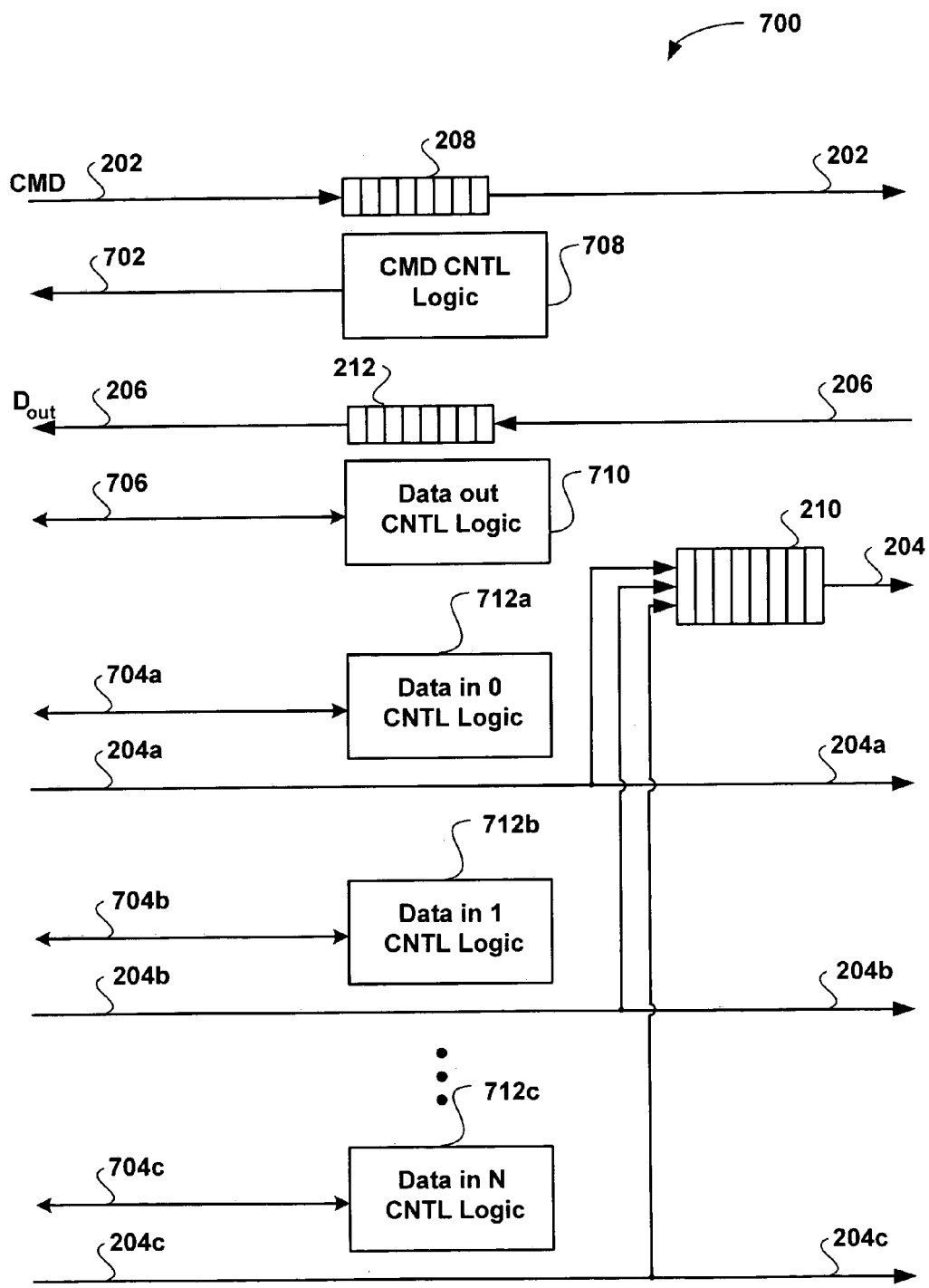
FIG. 7 is a block diagram showing detailed view of a data transaction interface for multi-port devices, in accordance with an embodiment of the present invention.

FIG. 7 is a block diagram showing detailed view of a data transaction interface 700 for multi-port devices, in accordance with an embodiment of the present invention. As described above, independent channels defined by the data transaction interface 700 are utilized to receive and transmit data, and include a command channel 202, data-in channels 204a–204c, and a data-out channel 206.

As described above, each of the independent channels 202–206 provides and receives data to and from a data transfer storage. In particular, the command channel 202 provides command data to the command transfer storage 208, and the data-out channel 206 receives data from the data-out transfer storage 212. The command channel can further include command control logic 708 to control the rate at which commands are received from the command channel. For example, the command control logic can provide a signal 702, such as the command_queue_full signal, to indicate the command transfer storage 208 is full. In a similar manner the data-out channel can include data-out control logic 710 to control the data-out signals. For example, the data-out control logic 710 can provide and receive signals 706 to indicate when data is available and when data is accepted by a source device.

The data-in channel includes separate data-in signals 204a–204c from each source device coupled to the multi-port device. That is, if n source devices are coupled to the multi-port device, n separate data-in signals 204a–204c, one from each source device, will be included in the data-in channel. Each data-in signal 204a–204c is coupled to the data-in transfer storage 210.

Table 4 below illustrates data-in channel signals for the port independent data transaction interface, in accordance with an embodiment of the present invention.

TABLE 4

| Signal | Type | Description |
| --- | --- | --- |
| datain_X[D:0] | Input | The write data associated with a write command. |
| datain_valid_X | Input | When asserted the data on datain is valid. The controller captures the data on the datain lines unless the datain_queue_full signal is asserted. If the datain_queue_full signal is asserted, the source device should keep the datain_valid signal high and hold the datain signal until the datain_queue_full signal de-asserts. |
| datain_mask_X[M:0] | Input | Data in byte mask. This is a byte mask for the incoming datain signals. This field is ignored during normal write transactions. During Masked_Write transactions, this field is used to mask out write data within the starting address and length parameters.<br>0 = do not mask byte<br>1 = mask byte |
| datain_queue_full_X | Output | This signal allows the memory controller to throttle write data. |

As mentioned above, multiple data-in signals are included in the data-in channel. Each data-in signal corresponds to a particular source_id. In table 4, the signals are appended with _X, wherein X is the number of the source_id. Thus, write data for that particular source_id is transferred using this set of interface pins. Write data can be sent to the data-in channel at any time before, during, or after the associated write command is issued to the memory controller. In one embodiment, the memory controller executes write transactions from a single source_id in order.

In operation, the memory controller accepts data whenever the data_valid_X signal is asserted and the registered value of the datain_queue_full_X signal is not asserted. This means that the source device has one entire cycle to stop the pipeline of data. The pipeline stalls as soon as the registered value of datain_queue_full_X assertes and can resume as soon as the registered value of the command datain_queue_full de-asserts. Similar to read requests, during a write request the source device supplies a starting address, the length of the request, the source_id, priority, and the command_valid signal.

As described above, the data-in channel is configured with a data-in transfer storage, which allows the source device to present data to the memory controller at any time without any throughput performance impact and simplifying the data transfer control logic. The source device is free to send write data to the memory controller before, during, or after a write command is issued as long as the datain_queue_full signal is not asserted. In one embodiment, the memory controller can wait to perform the write until enough data is captured to complete a burst to the memory. In this embodiment, any latency penalty is paid during the "startup" of the pipeline. Once the pipe is full, the data is written to the memory with no throughput impact. The depth of the data-in transfer storage can be, for example, eight words. In addition, the data-in transfer storage allows write data for each source_id to be stored within the memory controller and used when the particular transaction reaches the head of the placement queue. The data-in transfer storage can also be divided up into segments, where each segment is allocated for data from one or more source_ids.

Figure 8:
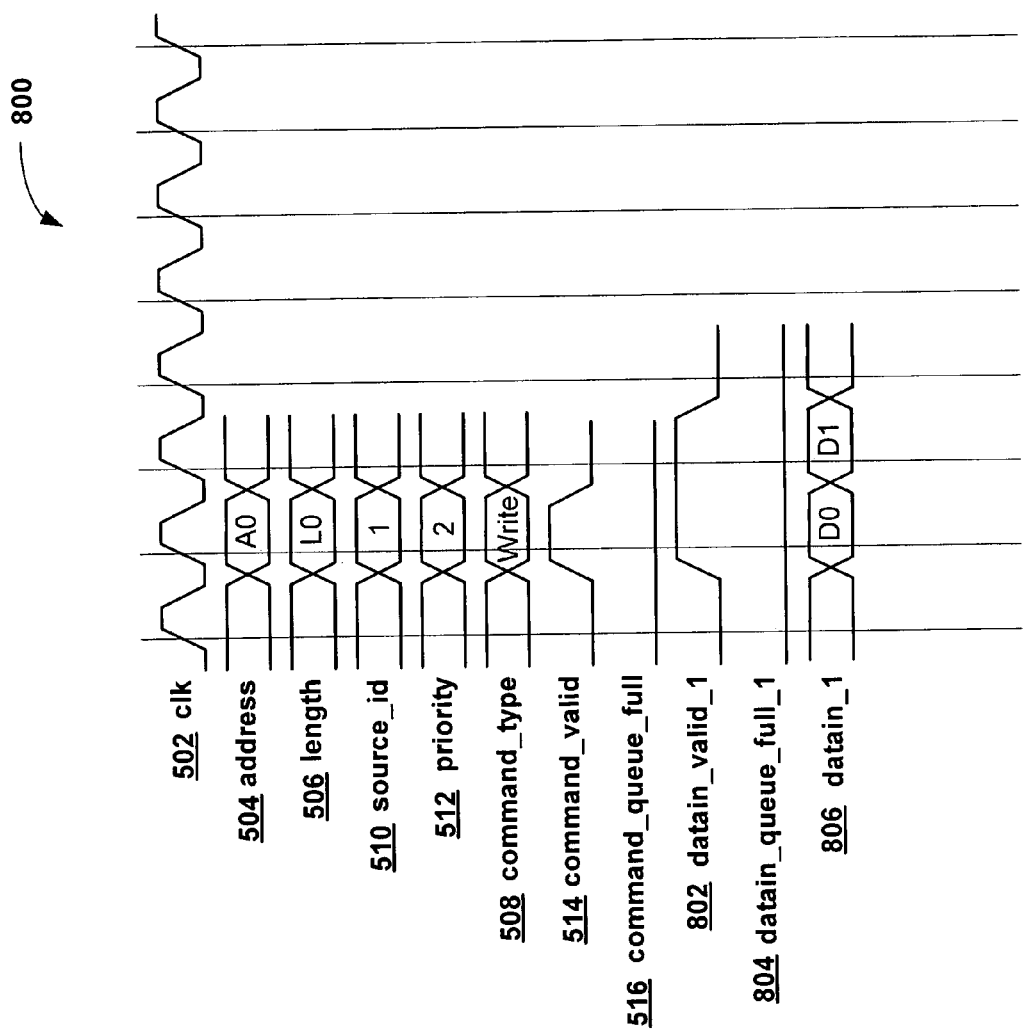
FIG. 8 is a timing diagram showing exemplary data-in channel and command channel waveforms, in accordance with an embodiment of the present invention.

FIG. 8 is a timing diagram showing exemplary data-in channel and command channel waveforms 800, in accordance with an embodiment of the present invention. The waveforms 800 include command channel signals for the clock 502, address lines 504, length lines 506, command_type lines 508, source_id lines 510, priority lines 512, command_valid lines 514, and command_queue_full lines 516. The waveforms 800 also illustrated data-in channel signals for datain_valid_1 lines 802, datain-queue_full_1 lines 804, and datain_1 lines 806.

In the example of FIG. 8, the command channel receives a write request from source device 1 to write data having a length L0 located at memory address A0, and having a priority of level 2. Thus, address A0 is received on the address lines 504 and length L0 is received on the length lines 506. Also, a write command type is received on the command_type lines 508 and a priority of 2 is received on the priority lines 512. In addition, the source_id 1 is received on the source_id lines 510 identifying source device 1 as the source of the write command. Finally, source device 1 signifies the request is valid by asserting the command_valid lines 514.

In addition, appropriate data for source device 1 is placed on the data-in channel signals for source device 1. In particular, data D0 is placed on the datain_1 lines 806, indicating D0 is write data from source device 1. In addition, source device 1 asserts the datain_valid_1 lines 802 to indicate data is ready to be read from the datain_1 lines 806. Since, in this example, the data-in transfer storage is not full, the datain_queue_full_1 is de-assert, indicating the write data D0 is accepted. Although FIG. 8 shows the data for the command arriving coincident with the write command, the data for this command may arrive before or after the write command.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A port independent data transaction interface for multi-port devices, comprising:
   a command channel that receives command data and a source id, the source id indicating a source device that transmitted the command data;
   a data-in channel having a data-in transfer storage that receives write data and a write source id, the write source id indicating a source device that transmitted the write data, the data-in channel having a data path that circumvents the data-in transfer storage; and
   a data-out channel that provides read data and a read id, the read id indicating a source device that transmitted a read command corresponding to the read data.

2. A port independent data transaction interface as recited in claim 1, wherein the source id is utilized to associate command data with corresponding write data.

3. A port independent data transaction interface as recited in claim 2, wherein the write data transmitted to the data-in channel and corresponding command data transmitted to the command channel are processed when transmitted during different clock signals.

4. A port independent data transaction interface as recited in claim 1, wherein the command channel further receives length data indicating a size of data corresponding to the command data, wherein the length data can indicate an arbitrary data size.

5. A port independent data transaction interface as recited in claim 4, wherein the command channel further receives address data indicating an address associated with data corresponding to the command data, wherein the address data can indicate an arbitrary starting location.

6. A port independent data transaction interface as recited in claim 1, wherein the command channel further receives a priority value indicating a priority level of the command data.

7. A port independent data transaction interface as recited in claim 6, wherein command data is processed based on an associated priority value.

8. A multi-port memory controller having port independent data transaction interface, comprising:
   a command transfer storage that receives command data and a source id, the source id indicating a source device that transmitted the command data;
   a data-in transfer storage that receives write data and a write source id, the write source id indicating a source device that transmitted the write data, the data-in transfer storage being in communication with a separate data-in signal for each source device coupled to the multi-port memory controller, each data-in signal being further coupled to a data path that circumvents the data-in transfer storage; and
   a data-out transfer storage that provides read data and a read id, the read id indicating a source device that transmitted a read command corresponding to the read data.

9. A multi-port memory controller as recited in claim 8, wherein the source id is utilized to associate command data with corresponding write data.

10. A multi-port memory controller as recited in claim 9, wherein the write data transmitted to the data-in transfer storage and corresponding command data transmitted to the command transfer storage are processed when transmitted during different clock signals.

11. A multi-port memory controller as recited in claim 8, wherein the command transfer storage further receives a priority value indicating a priority level of the command data.

12. A multi-port memory controller as recited in claim 11, wherein command data is processed based on an associated priority value.

13. A method for performing data transactions in a multi-port system, comprising the operations of:
   receiving command data and a source id on a command channel during a first clock cycle, the source id indicating a source device that transmitted the command data;
   receiving write data and a write source id at a data-in transfer storage via a data-in channel during a second clock cycle, the write source id indicating a source device that transmitted the write data;
   associating the command data with the write data based on the source id and the write source id;
   transmitting both the command data and write data from the data-in transfer storage to a processing circuit for further processing during a third clock cycle when the data-in transfer storage has unused storage capacity; and
   transmitting both the command data and write data via a data path that circumvents the data-in transfer storage when the data-in storage is full.

14. A method as recited in claim 13, wherein the first clock cycle, second clock cycle, and third clock cycle are each separated by a plurality of clock cycles.

15. A method as recited in claim 13, further comprising the operation of providing read data and a read id on a data-out channel during a fourth clock cycle, the read id indicating a source device that transmitted a read command corresponding to the read data.

16. A method as recited in claim 15, further comprising the operation of associating command data with the read data based on a source id and the read id.

17. A method as recited in claim 13, further comprising the operation of receiving a priority value on the command channel during the first clock cycle, wherein command data is processed based on an associated priority value.

* * * * *